United States Patent
Liang et al.

(10) Patent No.: US 7,715,510 B2
(45) Date of Patent: May 11, 2010

(54) METHOD AND DEVICE TO MAINTAIN SYNCHRONIZATION TRACKING IN TDD WIRELESS COMMUNICATION

(75) Inventors: Jingxin Liang, Shanghai (CN); ZHiyu Zhang, Shanghai (CN)

(73) Assignee: ST-Ericsson SA, Geneva (CH)

( * ) Notice: Subject to any disclaimer, the term of this patent is extended or adjusted under 35 U.S.C. 154(b) by 1060 days.

(21) Appl. No.: 10/540,694

(22) PCT Filed: Dec. 29, 2003

(86) PCT No.: PCT/IB03/06248

§ 371 (c)(1), (2), (4) Date: Apr. 14, 2006

(87) PCT Pub. No.: WO2004/059864

PCT Pub. Date: Jul. 15, 2004

(65) Prior Publication Data

US 2006/0227853 A1 Oct. 12, 2006

(30) Foreign Application Priority Data

Dec. 30, 2002 (CN) .............................. 02 1 60462

(51) Int. Cl.
H04L 7/00 (2006.01)
H04B 1/00 (2006.01)

(52) U.S. Cl. .................. 375/365; 375/149; 375/150

(58) Field of Classification Search ............... 375/142, 375/145, 149, 224, 226, 347, 354–355, 371, 375/E1.017, E1.037, 140, 147, 150, 343, 375/362–367, 377; 714/704, 707; 342/357.01, 342/357.06; 701/207; 455/502; 370/58.1, 370/77, 95.3, 280, 294, 314, 320–321, 335, 370/337, 342, 347, 441–442, 478, 503, 509, 370/512, 514, 520, 522, 526, 528, 915

See application file for complete search history.

(56) References Cited

U.S. PATENT DOCUMENTS

| 5,754,584 | A  | * | 5/1998 | Durrant et al. | ............... | 375/142 |
| 5,761,211 | A  |   | 6/1998 | Yamaguchi et al. |  |  |
| 6,584,150 | B1 | * | 6/2003 | Wu et al. | ............... | 375/231 |
| 6,690,658 | B1 | * | 2/2004 | Klank | ............... | 370/324 |
| 6,760,365 | B2 | * | 7/2004 | Demir et al. | ............... | 375/150 |

(Continued)

FOREIGN PATENT DOCUMENTS

| GB | 2 371 725 A | 7/2002 |
| WO | WO 99/60759 A1 | 11/1999 |
| WO | WO 00/64113 | 10/2000 |

OTHER PUBLICATIONS

International Search Report dated Mar. 17, 2004 in connection with PCT Application No. PCT/IB03/06248.
Ming Lei, et al., "Channel estimation based on midamble in ultra-TDD systems", International Conference on Telecommunications, vol. 2, Jun. 23, 2002, p. 434-438.
Griparis, et al., "Channel estimation and tracking techniques for DS-CDMA systems", International Conference on Telecommunications, vol. 3, Jun. 21, 1998, p. 108-113.

*Primary Examiner*—Tesfaldet Bocure
*Assistant Examiner*—Lawrence B Williams

(57) ABSTRACT

A Method to maintain Synchronization Tracking in TDD Wireless Communication comprises the steps: divide a midamble into two parts, then detect the first part and the second part of the midamble; perform an auto-correlation property operation between the two parts and a part corresponding to a local midamble and obtain two peaks; compare the amplitude of the two peaks; advance or retard a local timer based on the result of the comparison. The interlaced sampling method will harm the SNR of channel estimation only very slightly. By using this method, the sample frequency can be decreased to only one time of the chip rate of a TD-SCDMA system while still maintaining the ability to track the downlink synchronization.

20 Claims, 3 Drawing Sheets

U.S. PATENT DOCUMENTS

| | | | | |
|---|---|---|---|---|
| 7,006,840 B2* | 2/2006 | Bultan et al. | ................ | 455/502 |
| 7,200,124 B2* | 4/2007 | Kim et al. | ................ | 370/324 |
| 7,603,133 B2* | 10/2009 | Bultan et al. | ................ | 455/502 |
| 2002/0172187 A1 | 11/2002 | Shalvi et al. | | |
| 2005/0197160 A1* | 9/2005 | Bultan et al. | ................ | 455/561 |

* cited by examiner

METHOD AND DEVICE TO MAINTAIN SYNCHRONIZATION TRACKING IN TDD WIRELESS COMMUNICATION

CROSS-REFERENCE TO RELATED APPLICATION(S)

The present application claims priority under 35 U.S.C. §365 to International Patent Application No. PCT/IB2003/006248 filed Dec. 29, 2003, entitled "METHOD AND DEVICE TO MAINTAIN SYNCHRONIZATION TRACKING IN TDD WIRELESS COMMUNICATION." International Patent Application No. PCT/IB2003/006248 claims priority under 35 U.S.C. §365 and/or 35 U.S.C. §119(a) to Chinese Patent Application No. 02160462.2 filed Dec. 30, 2002 and which are incorporated herein by reference into the present disclosure as if fully set forth herein.

FIELD OF THE INVENTION

The invention relates to a method and device to maintain synchronization tracking, and, in particular, to a method and device in a Time Division Duplex (TDD) Wireless Communication System.

BACKGROUND OF THE INVENTION

Figure 1:
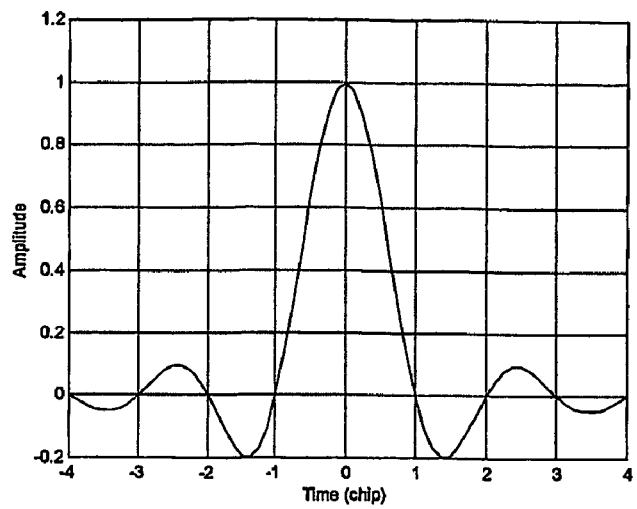
Figure 2:
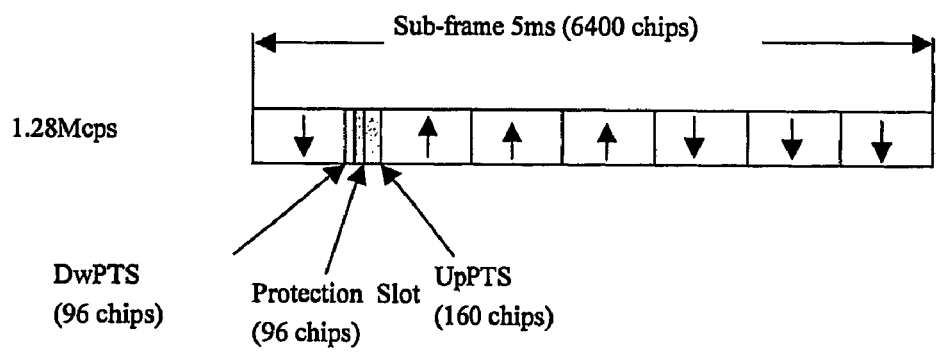
Figure 3:
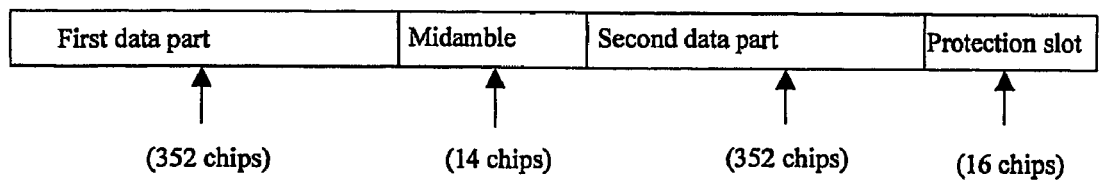

TD-SCDMA is a 3G standard adopted by the International Telecommunication Union (ITU). It takes advantage of TDMA and synchronous CDMA and provides high spectrum efficiency and service flexibility. In a TD-SCDMA system, it is very important that user equipment (UE) is synchronized to the received signal from Node-B. In general, signal synchronization can be divided into two stages: final synchronization and synchronization tracking. The base of synchronization is on a chip level. Every chip in Node-B is shaped into an ISI-free waveform by using a shaping filter, as shown in FIG. 1. Denote the waveform function of an RRC filter as f(t). In a UE system, to acquire the maximum SINRN, the UE should sample at the peak of the chip waveform, corresponding to time=0 in FIG. 1. In TD-SCDMA, there are two sub-frames in each radio frame, which is of ten milliseconds (10 ms) length. The sub-frame format is shown in FIG. 2. In a sub-frame, there are seven common time slots and two special time slots. The two special time slots include DwPTS and UpPTS. In FIG. 3, the structure of a common time slot is shown. There are two data parts in one time slot, and in the middle of the two data parts, there is a midamble part. The midamble is used to estimate the radio multi-path and is also quite important in maintaining the downlink synchronization.

After having acquired the initial synchronization of the downlink signal, the UE enters into the stage of keeping the synchronization. Because the UE does not know the exact time offset information between the local timer and the downlink signal from Node-B, traditionally an X-times sampling rate is used, where X is an integer larger than 1, i.e. 2, 4 or even 8. Then the UE uses an RRC filter to filter the sample stream. The filter output will shape an auto-correlation waveform of SYNC-DL. The highest peak corresponds to the most likely synchronization point. Using the method, the synchronization time error will be within $[-T_c/2X, T_c/2X]$. "Early/late gate" is a commonly seen implementation according to the theory set forth above. Another commonly used synchronization method is "τ dithering loop".

Because a high value of the sample multiple X raises the speed requirement for an analog to digital (A/D) converter, bigger buffer size and computation complexity are required. Bigger buffer size and computation complexity will raise the cost of the hardware system and the consumption of the A/D conversion. So in general, a smaller sample multiple X is better, but if the sample multiple X is too small, then the synchronization precision will decrease. Therefore, the sample multiple X is often set to a value of four (4).

SUMMARY OF THE INVENTION

The invention resolves the technical problem of providing a new interlaced sampling method to sample the midamble part in a TD-SCDMA time slot, and in this way, when the sampling multiple is one (1), the system still provides a good synchronization tracking performance. When the sampling multiple is one (1), namely, the real offset within $[-T_c/2, T_c/2]$, rough synchronization has been acquired.

The method of the invention includes the following steps:

a. Divide a midamble into two parts, then detect the first part of the midamble and the second part of the midamble respectively;

b. Perform an auto-correlation operation of the two parts and the corresponding part of the local midamble to obtain an amplitude for each of the two peaks;

c. Compare the amplitudes of the two peaks;

d. Decide to advance or retard a local timer based on the compared results.

The sample time point for detecting the midamble is:

1. when $353 \leq n \leq 496$, if n is even, the sample time point is $(n-\Omega)T_c$;

2. when $353 \leq n \leq 496$, if n is odd, the sample time point is $(n+\Omega)T_c$;

Here, Ω must be a small value, because if Ω is too big, the auto-correlation peak will decrease, which is a disadvantage to channel detecting. The principle for selecting the Ω value is that Ω is a random value less than one fourth (¼). In this way, the time difference between $(n+\Omega) T_c$ and $(n-\Omega) T_c$ is less than half of the chip period. The midamble {m1, m2, m3, ... m144} is divided into an odd part {m1, m3, m5, ... m143} and into an even part {m2, m4, m6, ... m144}. The method detects the odd part and the even part of the midamble by using a match filter and obtain obtains two peaks. The method then compares the amplitude of the two peaks. If the amplitude of the peak of the even part is higher than the amplitude of the peak of the odd part, the method advances the local timer by $\Omega T_c$. On the contrary, if the amplitude of the peak of the odd part is higher than the amplitude of the peak of the even part, the method advances the local timer by $-\Omega$ T. The midamble is also a downlink synchronization sequence.

Take the 16$^{th}$ midamble as an example. When one uses another signal sequence, the result is the same. As the odd part and the even part have the same auto-correlation peak and the peak is half of the auto-correlation peak of the entire signal sequence, one can assume that the sampling offset is τ. Using a normal sampling method, the peak of the midamble auto-correlation is directly proportional to f(τ). However, using the interlaced-sampling method of the invention, the peak of the midamble auto-correlation is proportional to $[f(\tau+\Omega)+f(\tau-\Omega)]/2$, so that the normalized error of channel detecting that is induced by interlaced-sampling will be about:

$$2f(\tau)/[f(\tau+\Omega)+f(\tau-\Omega)], -T_c/2 < \tau < T_c/2 \qquad (1)$$

As can be seen, both peaks are nearly the same except that the peak amplitude of the latter peak (the even part) is a little lower than the former peak (the odd part). Compared with the prior art method, the new interlaced-sampling method will only harm the signal to noise ratio (SNR) of the channel detecting very slightly by using the midamble. By using the new method of the invention, the sample frequency can be decreased to only one time of the chip rate and TD-SCDMA can still maintain the ability to track the downlink synchronization. In this way, one can adopt a cheaper analog to digital (A/D) converter and greatly reduce the buffer size. The tracking error can be substantially within the range $[-T_c/16, T_c/16]$, which is same as the error that occurs when one uses the prior art method with X=8.

BRIEF DESCRIPTION OF THE DRAWING FIGURES

Figure 4:
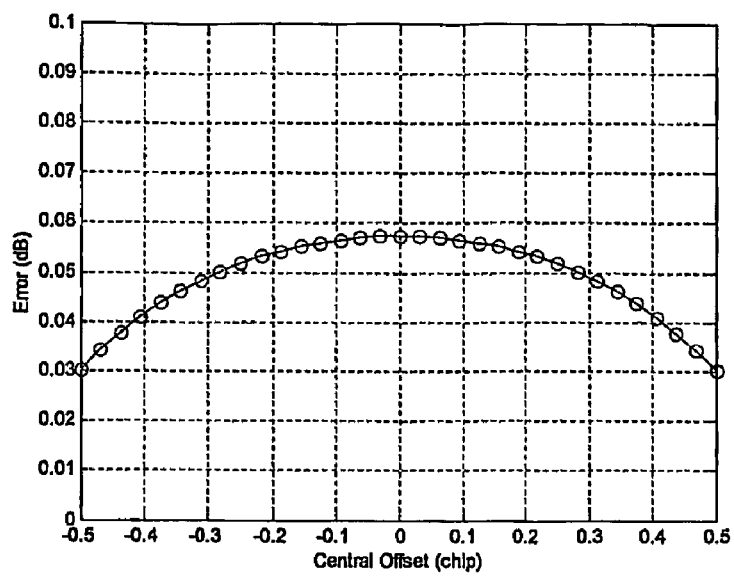
Figure 5:
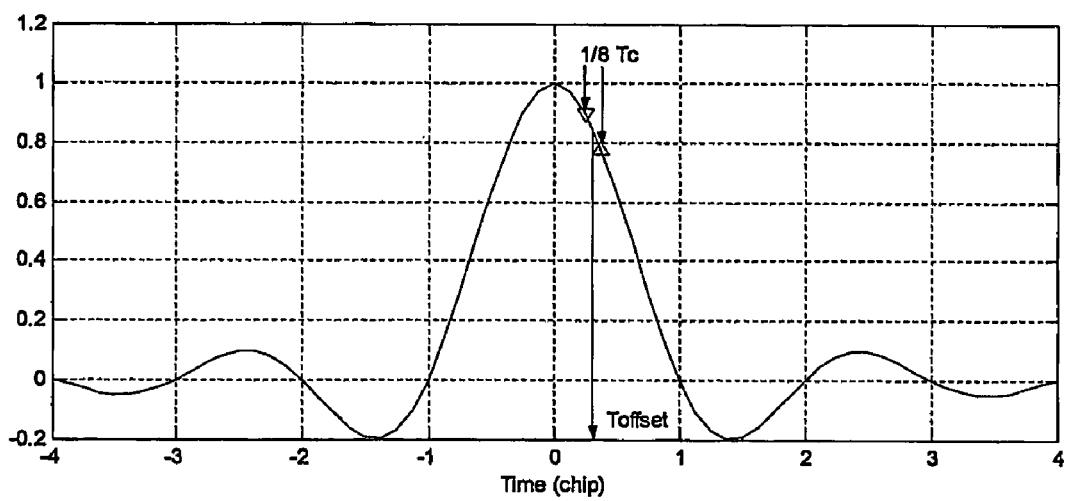
Figure 6:
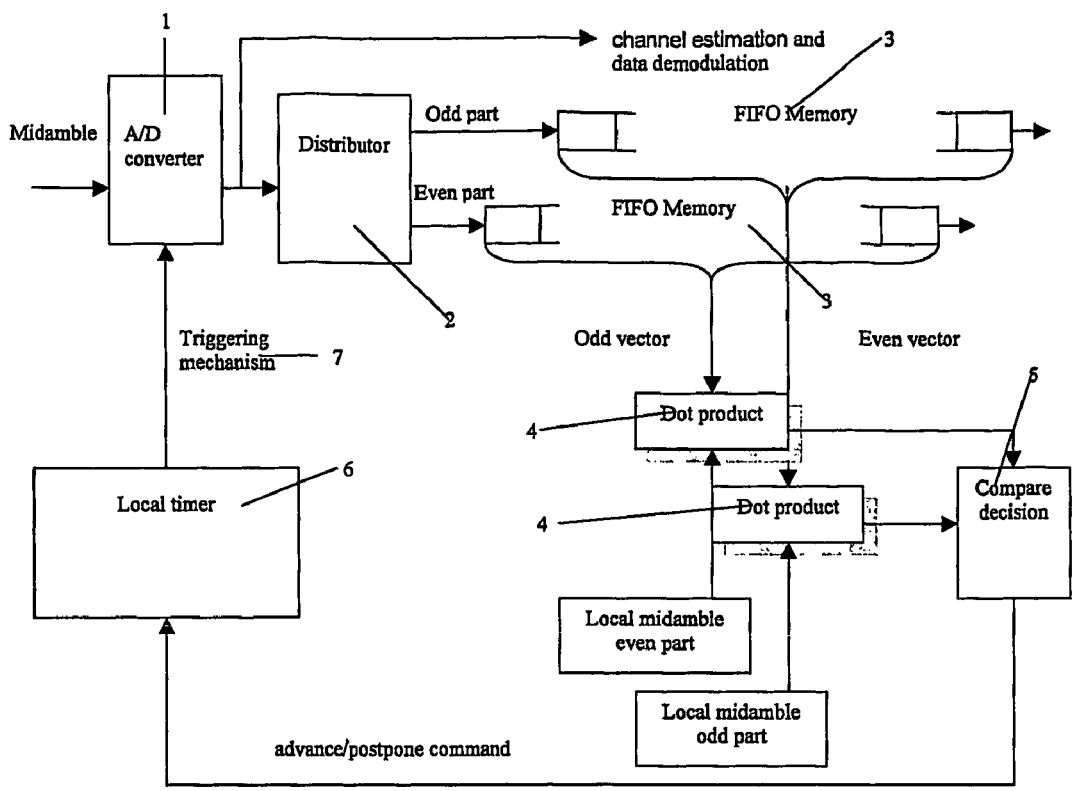
Figure 7:
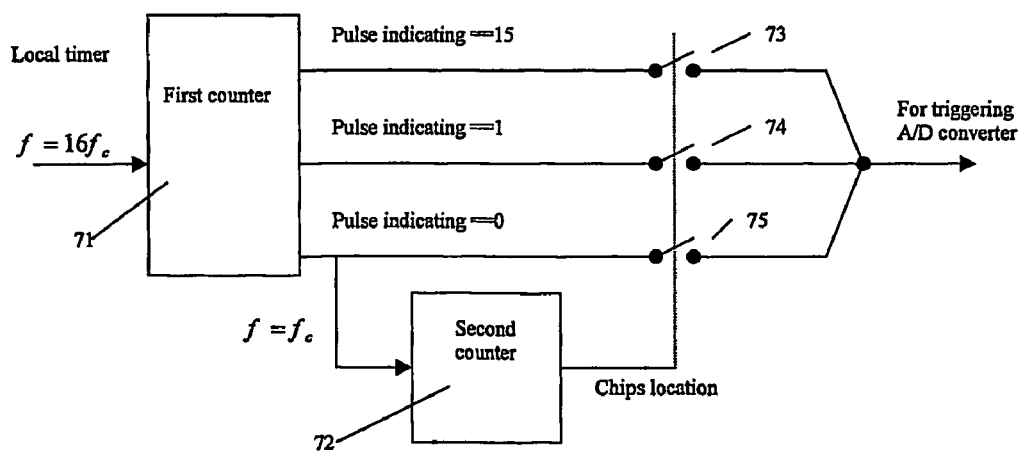

FIG. 1 is an RRC Shaping Filter Response.
FIG. 2 is the structure of a sub-frame.
FIG. 3 is the structure of a time slot.
FIG. 4 is the error of channel estimation with an interlaced midamble.
FIG. 5 is the sampling point offset of current data parts.
FIG. 6 is an advantageous embodiment for carrying out the invention implemented in a device of downlink synchronization tracking in a TDD wireless communication system; and
FIG. 7 is an advantageous embodiment for carrying out the invention implemented in triggering device in the device shown in FIG. 6.

DETAILED DESCRIPTION OF THE INVENTION

In an initial design, the value of Ω is set as one sixteenth (1/16). By controlling the triggering pulse to the A/D converter, the sampling time points for all the eight hundred sixty four (864) chips in a time slot are
1. when $1 \leq n \leq 352$, the sampling time point is $nT_c$;
2. when $353 \leq n \leq 496$, if n is even, the sampling time point is $nT_c$;
3. when $353 \leq n \leq 496$, if n is odd, the sampling time point is $nT_c$;
4. when $497 \leq n \leq 864$, the sampling time point is $nT_c$.

The letter n designates the chip location, the Ω designates a random value less than one fourth (1/4), and the $T_c$ designates the chip period. In the example, the midamble is a midamble. The midamble {m1, m2, m3, ... m144} is divided into an odd part {m1, m3, m5, ... m143} and into an even part {m2, m4, m6, ... m144}. Detect the odd part and the even part of midamble using a match filter and obtain two peaks, then compare the amplitude of the two peaks. If the latter (even part) is higher than the former (odd part), advance the local timer by $T_c/16$. On the contrary, if the former (odd Part) is higher than the latter (even part), advance the local timer by $-T_c/16$. The signals sequence can be the midamble, and also the downlink synchronization sequence.

According to the method set forth above, because the peak of the auto-correlation of the odd part (and the even part) has only half the amplitude of that of the entire midamble, in a noisy environment, the signal to noise ratio (SNR) of the odd part (and the even part) is three decibels (3 dB) lower than that of the entire midamble. This may lead to more errors in comparison of the auto-correlation peak amplitude of the odd part and the even part. Next, an example will be given to explain the feasibility of the method of the invention.

Assume that one vehicle runs at 120 km/hr and moves 0.167 m in every sub-frame time (5 ms). When the distance between the UE and the Node-B is changed because of movement, the UE should advance/retard the local downlink timer by $T_c/16$ (the chip rate is 1.28 M, $T_c$=781 ns). In the time period $T_c/16$, a wireless wave can transmit 14.5 m distances at 300,000 km/s, which means: if the UE really needs to advance/retard the local downlink timer because of movement, it can make a decision after comparing the auto-correlation peak of the odd part and the even part in as many as [14.65/0.167]=87 sub-frames. There are at least two downlink time slots in one sub-frame, so in 87 sub-frames there are at least 174 usable midambles to be decided. This makes a nearly error-free decision.

According to the calculation above, there can be as many as 174 comparison results. If more than $[174(1+\Delta)/2]=N_T$ results are positive, the local timer advances $T_c/16$. Otherwise the local timer retards $T_c/16$. Here [•] means the integer no greater than. If there are not more than NT positive or negative comparison results the local timer remains unchanged. Here the symbol Δ represents a protection margin which is used to avoid unnecessary dithering of the local timer (in the following mathematical analysis, Δ is set to a value of 0.1).

When the vehicle speed is, lower than 120 km/hr the UE can compare auto-correlation peaks of more than 174 odd and even parts before making a decision. This will lead to better performance.

As can be seen in FIG. 5, Δ marks an odd sampling point and ∇ marks an even sampling point. Assume that the sampling point of the current data part has an offset $T_{offset}$, $-T_c/2 < T_{offset} < T_c/2$. Then correct tracking will advance the local timer by $\pm T_c/16$ towards the correct direction. Correct tracking is an important precondition for implementing the invention.

In the analysis, maybe the selected parameters are not the best (such as the value of Δ, the interlaced offset Q and the adjustment step $T_c/16$, etc.) but in a real environment they can be tuned to perform better.

As can be seen in FIG. 6, a device for downlink synchronization tracking in a TDD wireless system is shown, which includes the following connected in turn:

An analog to digital (A/D) converter 1 to convert analog signals to data signals;

A distributor 2 to divide a midamble into an odd part and an even part;

Two first in first out (FIFO) memories 3 to temporarily save the signals from the distributor 2;

A dot product unit 4 to perform an auto-correlation operation to the odd part and to the even part of the midamble from the FIFO memories 3 and the respectively corresponding part of the local midamble;

A Compare Decision unit 5 to compare the auto-correlation peaks of the odd and even parts; and A local timer 6 to decide advances or retards according to decision results.

The output signals of the local timer 6 triggers the analog to digital converter 1 through triggering mechanism 7.

As can be seen in FIG. 7, there is a triggering mechanism 7 for downlink synchronization tracking in TDD wireless communication. The triggering mechanism 7 includes: a first counter 71 to provide pulse indicating, a plurality of switches 73, 74 and 75, second counter 72 to provide chip location indicating.

The switches turn on and turn off according to the pulse indication of the first counter 71 and the location indication of the second counter 72. The first counter 71 is hexadecimal. The switches include the following three switches: the first switch 73, the second switch 74 and the third switch 75. When the pulse identification is fifteen (15), the chip location indication is 353~496 and is even, the first switch 71 closes; when the pulse indication is one (1), the chip location is 353~496 and is odd, the second switch 74 closes and when the pulse indication is zero (0), the chip location is 1~352. 497~864 the third switch 75 closes.

The invention is not restricted to the method and device described above. The device shown in FIG. 6 and in FIG. 7 may also be implemented partly in software. The midamble can be also divided into two parts using other methods. So all the technical changes that are known by persons who are skilled in the field should fall into the protective scope of the invention.

What is claimed is:

1. A method of maintaining Synchronization Tracking in Time Division Duplex (TDD) Wireless Communications, the method for use in a terminal of a user equipment (UE) system, wherein the method comprises:
   dividing a midamble into two parts, then detecting a first part and a second part of the midamble, respectively;
   performing an auto-correlation property operation between the two parts and a part corresponding to a local midamble;
   obtaining two peaks from the auto-correlation property operation;
   comparing the amplitude of the two peaks; and
   advancing or retarding a local timer based on a result of the comparison.

2. The method of maintaining Synchronization Tracking in TDD Wireless Communications as set forth in claim 1 wherein a sample frequency of detecting the midamble is only one time of a chip rate of a TD-SCDMA system.

3. The method of maintaining Synchronization Tracking in TDD Wireless Communications as set forth in claim 1 wherein said midamble is divided into two parts having a same length.

4. The method of maintaining Synchronization Tracking in TDD Wireless Communications as set forth in claim 2 wherein said midamble is divided into an odd part and an even part.

5. The method of maintaining Synchronization Tracking in TDD Wireless Communications as set forth in claim 4 wherein a sampling time point for detecting the midamble is:
   $(n-\Omega)T_c$, when n is even; and
   $(n+\Omega)T_c$, when n is odd, wherein
   n is a chip location, $\Omega$ is a value set lower than one (1), and $T_c$ is a chip period.

6. The method of maintaining Synchronization Tracking in TDD Wireless Communications as set forth in claim 4 wherein if a peak amplitude of the even part is higher than a peak amplitude of the odd part, the local timer is advanced by $+T_c/16$, and if a peak amplitude of the odd part is higher than a peak amplitude of the even part, the local timer is advanced by $-T_c/16$.

7. The method of maintaining Synchronization Tracking in TDD Wireless Communications as set forth in claim 4, wherein when a distance between the UE and a Node-B of a TD-SCDMA system is changed because of movement, the UE makes a decision after comparing an auto-correlation peak of the odd part and the even part in a plurality of subframes, there can be as many comparison results as the plurality of subframes, and if a number of positive results is more than a set value, then the local timer advances $\Omega T_c$, otherwise, the local timer retards $\Omega T_c$, wherein a positive result occurs when a peak amplitude of an even part is higher than a peak amplitude of the odd part.

8. The method of maintaining Synchronization Tracking in TDD Wireless Communications as set forth in claim 7 wherein if neither a number of positive or negative results is more than the set value, the local timer remains unchanged, wherein a negative result occurs when a peak amplitude of an odd part is higher than a peak amplitude of an even part.

9. The method of maintaining Synchronization Tracking in TDD Wireless Communications as set forth in claim 7, wherein the set value is $$\left\lfloor \frac{M(1+\Delta)}{2} \right\rfloor,$$

where $\Delta$ is a protection margin.

10. The method of maintaining Synchronization Tracking in TDD Wireless Communications as set forth in claim 5, wherein said $\Omega$ is lower than one fourth (¼).

11. The method of maintaining Synchronization Tracking in TDD Wireless Communications as set forth in claim 9, wherein said $\Delta$ is one tenth (0.1).

12. The method of maintaining Synchronization Tracking in TDD Wireless Communications as set forth in claim 1, wherein said midamble is used to achieve downlink synchronization.

13. A terminal of a user equipment (UE) system in Time Division Duplex (TDD) Wireless Communications, wherein the terminal comprises:
   a divider for dividing a midamble into two parts;
   a dot product unit which performs an auto-correlation property operation between the two parts and a part corresponding to the local midamble to obtain two peaks that correspond to the midamble parts;
   a comparator which compares an amplitude of each of the two peaks; and
   a local timer which is advanced or retarded based on a comparison of the amplitudes of the two peaks.

14. A terminal of a UE system in TDD Wireless Communications as set forth in claim 13, wherein said divider divides the midamble into two parts in which each part has the same length.

15. A terminal of a UE system in TDD Wireless Communications as set forth in claim 14, wherein said midamble is divided into an odd part and an even part.

16. A terminal of a UE system in TDD Wireless Communications as set forth in claim 13, wherein said comparator makes a comparison in which: if the peak amplitude of the even part is higher than the peak amplitude of the odd part, the local timer is advanced by $\Omega T_c$, if the peak amplitude of the odd part is higher than the peak amplitude of the even part, the local timer is advanced by $-\Omega T_c$, where said $\Omega$ is a value set lower than one (1), and $T_c$ is a chip period.

17. A terminal of a UE system in TDD Wireless Communications as set forth in claim 13, wherein said midamble is used to achieve downlink synchronization.

18. A terminal of a UE system in TDD Wireless Communications as set forth in claim 16, wherein said $\Omega$ is lower than one fourth (¼).

19. A terminal of a UE system in TDD Wireless Communications as set forth in claim 13 wherein said terminal further comprises a triggering mechanism that comprises a first counter that provides a pulse indication and a second counter that provides a chip location indication.

20. A terminal of a UE system in TDD Wireless Communications as set forth in claim 19 wherein said triggering mechanism further comprises a plurality of switches connected to the first counter and to the second counter wherein the plurality of switches operate in response to a pulse indication of the first counter and in response to a location indication of the second counter.

* * * * *